(12) United States Patent
Lainé et al.

(10) Patent No.: US 9,180,980 B2
(45) Date of Patent: Nov. 10, 2015

(54) SYSTEM IN SPACE FOR REINFORCING PHOTOSYNTHESIS AND METHOD

(75) Inventors: Robert André Lainé, Paris (FR); Pierre Parrot, Paris (FR)

(73) Assignee: ASTRIUM SAS, Paris (FR)

( * ) Notice: Subject to any disclaimer, the term of this patent is extended or adjusted under 35 U.S.C. 154(b) by 803 days.

(21) Appl. No.: 13/128,204

(22) PCT Filed: Nov. 23, 2009

(86) PCT No.: PCT/FR2009/052248
§ 371 (c)(1),
(2), (4) Date: May 6, 2011

(87) PCT Pub. No.: WO2010/061105
PCT Pub. Date: Jun. 3, 2010

(65) Prior Publication Data
US 2011/0211250 A1    Sep. 1, 2011

(30) Foreign Application Priority Data
Nov. 25, 2008  (FR) ..................................... 08 06609

(51) Int. Cl.
*G02B 23/00*     (2006.01)
*B64G 1/10*      (2006.01)
(Continued)

(52) U.S. Cl.
CPC .. *B64G 1/10* (2013.01); *A01G 7/04* (2013.01); *A01G 15/00* (2013.01); *B64G 1/443* (2013.01); *B64G 1/66* (2013.01); *B64G 9/00* (2013.01); *F21S 11/00* (2013.01); *G02B 17/0652* (2013.01)

(58) Field of Classification Search
CPC ............ G02B 5/08; G02B 5/20; G02B 23/00; B64G 1/10; B64G 1/1007; B64G 1/1014; B64G 1/14; B64G 1/24; B64G 1/44; B64G 1/46; A01G 7/04; A01G 15/00
USPC .................. 359/364–366, 399–430, 850–861
See application file for complete search history.

(56) References Cited

U.S. PATENT DOCUMENTS 4,305,555 A    12/1981   Davis
4,371,135 A     2/1983   Keigler
5,019,768 A     5/1991   Criswell et al.
(Continued)

OTHER PUBLICATIONS

International Search Report completed Mar. 26, 2010 and mailed Jun. 4, 2010 from corresponding International Application No. PCT/FR2009/052248, filed Nov. 23, 2009 (3 pages).
(Continued)

*Primary Examiner* — Thong Nguyen
(74) *Attorney, Agent, or Firm* — Klein, O'Neill & Singh, LLP

(57) ABSTRACT

The present disclosure relates to a system in space for reinforcing photosynthesis on earth, comprising a satellite with at least one first optical assembly intended for collecting sunlight, the position of which is stationary; a second optical assembly, smaller in size and with less inertia than the first optical element, intended for retransmitting the collected light with higher density of the retransmitted flux density than the collected flux density, and with an adjustable orientation; a remotely controllable means capable of adjusting the orientation of the second optical assembly; and a light-transmitting means which transmits the collected light from the first optical assembly to the second optical assembly. The second optical assembly retransmits light only in specified frequency hands around 450 nm and 660 nm.

20 Claims, 2 Drawing Sheets

(51) Int. Cl.

| | | |
|---|---|---|
| *B64G 1/44* | (2006.01) | |
| *A01G 7/04* | (2006.01) | |
| *A01G 15/00* | (2006.01) | |
| *B64G 1/66* | (2006.01) | |
| *B64G 99/00* | (2009.01) | |
| *F21S 11/00* | (2006.01) | |
| *G02B 17/06* | (2006.01) | |

(56) References Cited

U.S. PATENT DOCUMENTS

| | | |
|---|---|---|
| 5,089,055 A * | 2/1992 | Nakamura .................... 136/248 |
| 5,114,101 A | 5/1992 | Stern et al. |
| 5,238,210 A | 8/1993 | Heitzmann |
| 5,984,239 A | 11/1999 | Chen |
| 6,241,192 B1 * | 6/2001 | Kondo et al. ............. 244/158.4 |
| 6,252,690 B1 * | 6/2001 | Laine ........................... 398/121 |
| 7,077,361 B1 | 7/2006 | Rabinowitz |
| 2003/0152292 A1 * | 8/2003 | Scott et al. .................... 382/298 |
| 2013/0032673 A1 * | 2/2013 | Kobayashi ................. 244/158.4 |

OTHER PUBLICATIONS

Written Opinion completed Mar. 26, 2010 and mailed Jun. 4, 2010 from corresponding International Application No. PCT/FR2009/052248, filed Nov. 23, 2009 (12 pages).

* cited by examiner

SYSTEM IN SPACE FOR REINFORCING PHOTOSYNTHESIS AND METHOD

CROSS-REFERENCE TO RELATED APPLICATION(S)

This is a national phase application under 35 U.S.C. §371 of PCT Application No. PCT/FR2009/052248, filed Nov. 23, 2009, which claims the benefit of French application No. 08/06609 filed Nov. 25, 2008, the contents of which are expressly incorporated herein by reference.

FIELD OF ART

The present method, system and device relates to a sunlight retransmitting satellite, as well as applications using one or more satellites of such a type.

Although not exclusively, the present method, system and device more particularly aim at lighting up, by means of sunlight, in particular by night, a geographical surface area of the Earth globe having a large area, for example several tens of square kilometers.

BACKGROUND

It is known that a mere sunlight reflector mounted on a satellite is not able to light up such a surface area of the Earth, unless using a reflector with a very large area, then supposing very high mass and inertia with all the (implementation, cost, positioning, etc.) problems resulting therefrom. As an illustration, should a surface be lit up of approximately one hundred square kilometers on the Earth, a reflector should undoubtfully be provided having its surface area of the order of several thousands of square meters if a total power of several megawatts was to be available. Now, a reflector (a mirror) with such a surface area would not only be difficult to achieve and to put in orbit, but would have such inertia that a possible re-pointing would require a powerful propelling system and would be quite time consuming. Thus, it would be difficult to regularly carry out repointings, so that it would be hardly conceivable to frequently modify the area to be lit up.

Furthermore, the document U.S. Pat. No. 5,019,768 discloses a system for transmitting micro-waves from the Moon to the Earth, using a micro-wave reflector being placed in orbit around the Earth and sending back to the Earth a radiation received from the Moon. Such a reflecting satellite is not able to light up a large surface area of the Earth.

SUMMARY

The present method, system and device aim at remedying the above mentioned drawbacks. It relates to a sunlight retransmitting satellite enabling to retransmit sunlight to a celestial body, in particular, with the aim of lighting up a large surface area of such a celestial body, including of the Earth, such an area being able to be easily modified.

To this end, according to the present method, system and device, said sunlight retransmitting satellite is remarkable in that it comprises at least one set of the following on-board members:
  a first optical assembly being intended for collecting sunlight, and the position of which is stationary with respect to the structure of the satellite;
  a second optical assembly smaller in size and inertia than said first optical assembly, being intended for retransmitting the light collected by said first optical assembly with a higher density of the retransmitted flux than the collected flux density, and the orientation of which is able to be modified with respect to the structure of the retransmitting satellite so as to modify the direction of the axis according to which light is retransmitted;
  remotely controllable means, being capable of adjusting the orientation of said second optical assembly; and
  light transmitting means being formed so as to transmit from said first optical assembly to said second optical assembly, whatever the orientation of the latter, any light collected by said first optical assembly.

Thus, thanks to the separation of the light collecting function (implemented by said first optical assembly) and the light retransmitting function (implemented by said second optical assembly), and thanks to the light being concentrated (to be described below), it is possible to differently achieve such two optical assemblies, and this, according to optimal characteristics for the aim to be reached, that is retransmitting light on large surface areas and being able to easily modify such areas, as described below.

Indeed:
  as, thanks to the present method, system and device, the first optical assembly is only intended for collecting sunlight, it should be simply directed to the sun and not be reoriented, slight little frequent corrections of the position and the orientation of the satellite being sufficient. Thus, this first optical assembly can be achieved with very high inertia and size so as to be able to collect a large amount of sunlight; and
  as, thanks to the present method, system and device, the only function of the second optical assembly comprises retransmitting the collected (and concentrated) sunlight, it could be achieved with a much lower size and inertia than those of said first optical assembly. This allows to more easily modify the orientation thereof with respect to the body of the satellite and to provide means capable of adjusting, easily and at a low cost, the orientation of the retransmitted sunlight. Thus, it is possible to easily and rapidly change the area to be illuminated.

It should be noticed that the retransmitting satellite according to the present method, system and device does not correspond to a mere relay satellite with two optical assemblies. Indeed, a mere relay satellite (that only resends the received light as such) would require optical assemblies of the same size, whereas, thanks to the present method, system and device, the collected sunlight is concentrated before being retransmitted, enabling to provide the above mentioned advantageous characteristics.

In a particular embodiment, said retransmitting satellite comprises filtering means for filtering the collected light so that the second optical assembly retransmits the light only in at least one predetermined frequency band. Preferably, said filtering means are achieved from surface treatments and from using appropriate materials for at least one of the following elements of the retransmitting satellite: the second optical assembly and the light transmitting means.

Moreover, in a particular embodiment, said light transmitting means comprise one of the following means:
  a periscope;
  a set of optical guides; and
  at least one optical fibre.

The present method, system and device also relate to a method for lighting up a particular area of a celestial body, in particular of the Earth.

To this end, such a method is remarkable in that:
  at least one sunlight retransmitting satellite, such as the above mentioned one, is placed in orbit around the celestial body;

such a retransmitting satellite is oriented so that said first optical assembly of said retransmitting satellite always remains directed to the sun, at least when the retransmitting satellite is travelling above a given region of said celestial body, so as to be able to collect sunlight upon such a travel; and the orientation of said second optical assembly of the retransmitting satellite is remotely adjusted, so that it retransmits the collected sunlight onto an area to be lit up of the celestial body when the retransmitting satellite is travelling above said region.

The present method, system and device further relate to a system in space for reinforcing photosynthesis on Earth.

According to the present method, system and device, said system in space comprises:

at least one sunlight retransmitting satellite, such as the above mentioned one, being placed in orbit around the Earth, being oriented so that said first optical assembly of said retransmitting satellite always remains directed to the sun, at least when it is travelling above a given region of the Earth, so as to be able to collect sunlight upon such a travel; and a control center for said retransmitting satellite being preferably provided on the Earth. Such a control center comprises, more specifically, controlling means being capable to remotely adjust the orientation of said second optical assembly of the retransmitting satellite and being formed so as to adjust such an orientation such that the retransmitting satellite retransmits the collected sunlight on a given area of the Earth, when it is travelling above such a region, with the aim to reinforcing photosynthesis on this area.

It is known that currently, the activity of photosynthesis on the Earth and in the sea is mainly dictated by the day/night daily cycle and the winter/summer yearly cycle. In some regions of the Earth globe, greenhouses are used for extending the growing periods for the plants. Such greenhouses are heated and lit up by usual means, being most frequently fossil fuel consumers. Some greenhouses are heated by energy coming from cooling towers of nuclear plants and lit up with the electricity from such plants. In all the cases, such greenhouses consume the energy produced in electric plants and are practically dedicated to populations having available the means required for building those greenhouses and supplying them with energy.

Thanks to the above mentioned system according to the present method, system and device, it is possible to reinforce photosynthesis on any area of the Earth, using to this end a gratis and freely available energy, i.e. sun energy.

In a preferred embodiment, said filtering means for the retransmitting satellite are formed so as to filter the collected light in order to retransmit the light within defined frequency bands respectively around 450 nm and 660 nm, corresponding to the light frequencies used for photosynthesis. Thus, only that part of the sun spectrum useful for the photosynthesis of plants and seaweed is retransmitted to the Earth. This enables to improve the growth of plants and seaweed, without however proportionally increasing the doses of ultraviolet and infrared radiation received on the ground.

Furthermore, advantageously, said controlling means for the control center comprise:

a calculation unit for determining control orders intended for the adjusting means for the orientation of said second optical assembly of the retransmitting satellite; and data emitting means being formed so as to transmit said control orders to said adjusting means, via cooperating data receiving means being mounted on the retransmitting satellite.

Furthermore, advantageously, said system also comprises a service center transmitting to said controlling center customers' requests, relating to reinforcing photosynthesis on at least one particular area of the Earth. Such customers could be, for example, farming companies or co-operatives planning to increase their crops, while reinforcing photosynthesis, including at night, on their cultivated grounds.

BRIEF DESCRIPTION OF THE FIGURES

The FIGS. of the appended drawing will better explain how the present method, system and device can be implemented. In these FIGS., like reference numerals relate to like components FIG. 1 schematically shows a system according to the present method, system and device for lighting up an area of a celestial body, including of the Earth, in particular for reinforcing photosynthesis therein.

DETAILED DESCRIPTION

Figure 1:
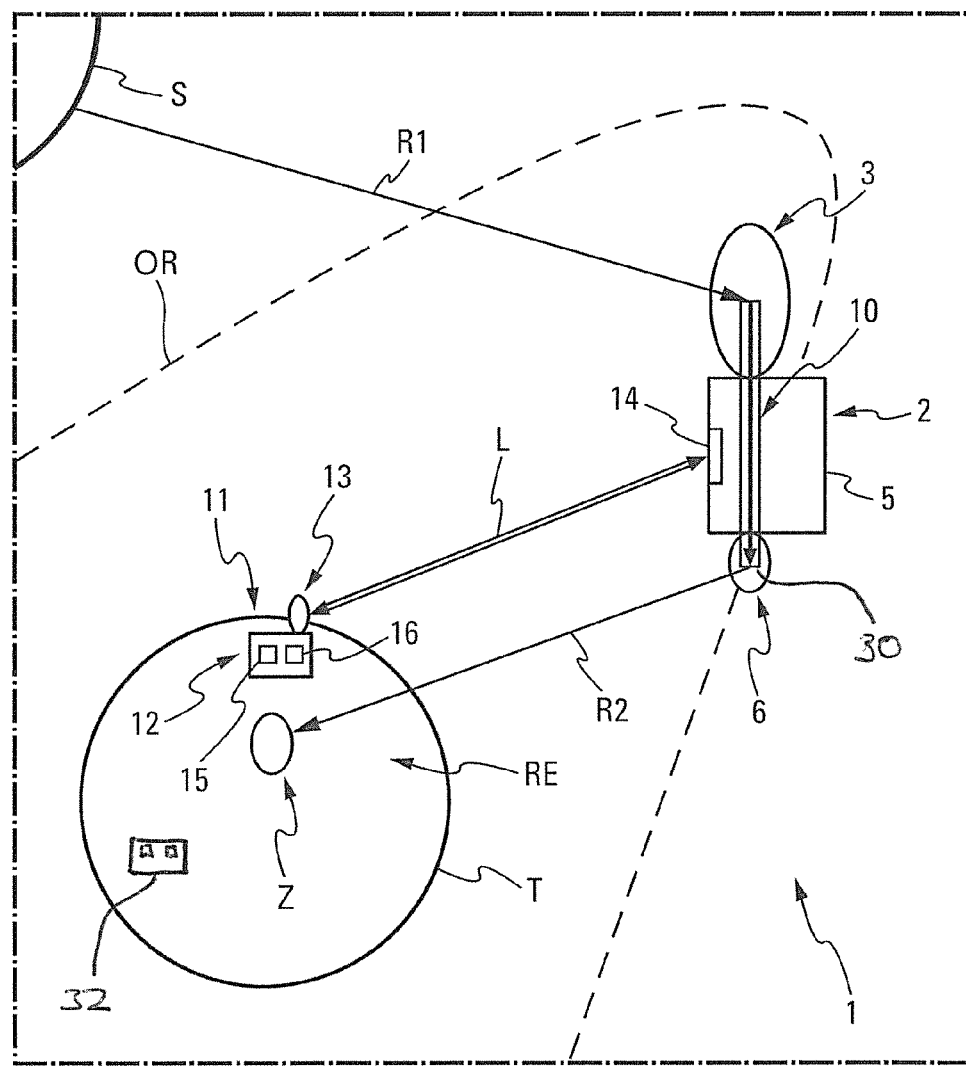

The system 1 according to the present method, system and device and schematically shown on FIG. 1 is a system in space being intended for lighting up with sunlight an area Z of a celestial body T, including of the Earth.

To this end, said system 1 comprises at least one sunlight retransmitting satellite 2, that it placed in orbit around such a celestial body T.

Figure 2:
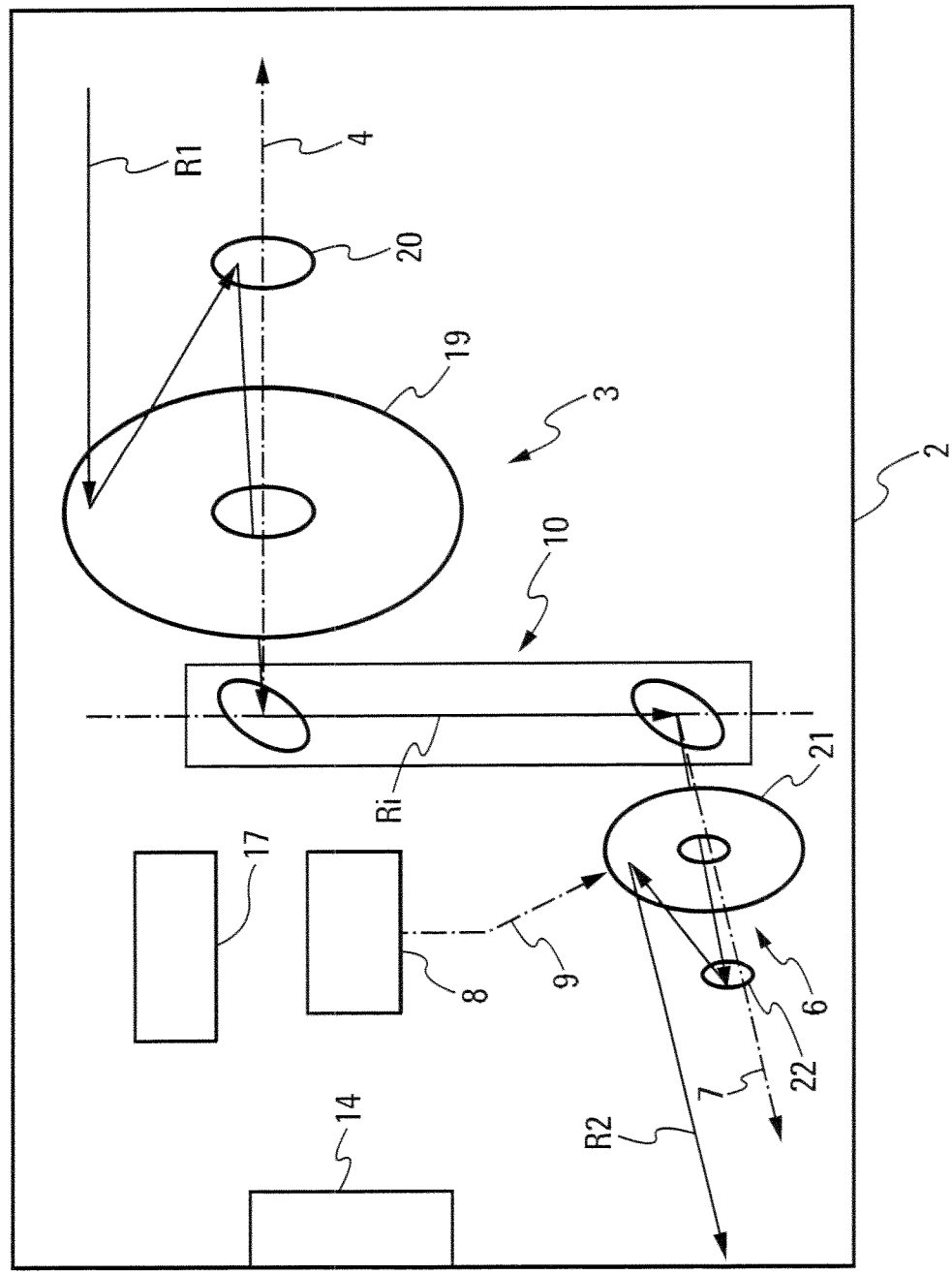
FIG. 2 schematically shows a sunlight retransmitting satellite according to the present method, system and device and being part of such a system.

According to the present method, system and device, such a satellite 2 comprises, as shown, in particular, on FIG. 2:

an optical assembly 3 being oriented according to a (collecting) axis 4 being always directed to the sun S when the satellite 2 is travelling above a given region RE of the celestial body T, in order to be able to collect directly sunlight in the form of a sun radiation R1. The position of said optical assembly 3 with high size and inertia is stationary with respect to the structure (or body) 5 of the satellite 2;

an optical assembly 6 with much lower size and inertia than those of said optical assembly 3. Such an optical assembly 6 is oriented according to an axis 7 being directed toward the celestial body T in order to retransmit, in the form of a radiation R2, the light collected by said optical assembly 3, upon the travel above the region RE (corresponding for example to a part of a country). Such light is retransmitted with a flux density that is much higher than the collected radiation flux density R1, as a result of a concentration of the light occurring on the satellite 2, as described below. Furthermore, the orientation of the optical assembly 6 is able to be modified with respect to the structure 5 of the satellite 2 so as to modify the (pointing) direction of the axis 7 according to which the light is retransmitted;

means 8 that are remotely controllable, as described below, and being capable of adjusting (that is, modifying) the orientation (of axis 7) of said optical assembly 6, as illustrated by a link 9 in mixed lines; and light transmitting means 10 that are formed so as to transmit from the optical assembly 3 to the optical assembly 6, whatever the orientation thereof, any light collected by the optical assembly 3 with a view to it being retransmitted by the optical assembly 6, as illustrated by a radiation Ri.

In addition to said retransmitting satellite 2, said system 1 further comprises a control center 11 for such a retransmitting satellite 2, preferably being provided on the Earth T. Such a control center 11 comprises, more particularly, controlling means 12 being able to adjust remotely the orientation of said optical assembly 6 of the retransmitting satellite 2 and being formed so as to adjust such an orientation such that the retransmitting satellite 2 retransmits sunlight (according to the retransmission axis 7) on a given area Z of the Earth T, when it is travelling above the region RE, in particular in order to reinforce photosynthesis on this area Z (being, for example, a cultivated area located in said region RE).

Thus, on the one hand, thanks to the light collecting function (implemented by said optical assembly 3) being separated from the light retransmitting function (implemented by said optical assembly 6), and on the other hand, to the light being concentrated, the two optical assemblies 3 and 6 could be achieved differently and this, according to optimum characteristics for the aim to be reached, i.e. retransmitting sunlight on at least one large surface area Z, that could further be easily modified.

Indeed:
- as the optical assembly 3 is only intended for collecting sunlight, it should be simply directed to the sun S (upon travelling above the region RE) and should not be reoriented, some slight little frequent corrections of the position and the orientation of the satellite 2 being, however, likely to be needed. Thus, it could be achieved with very significant inertia and size so that it is able to collect a large amount of sunlight; and
- said optical assembly 6, having the mere function of retransmitting the collected (and concentrated) sunlight could be achieved according to much smaller size and inertia as those of said optical assembly 3. This allows to more easily modify the orientation thereof compared to the body 5 of the satellite 2 and to provide means 8 capable of adjusting easily and at a reduced cost the orientation of said optical assembly 6. Thus, it is possible to easily and rapidly change the orientation of the axis 7 and thus, the location on the celestial body T of the area Z being lit up when the satellite 2 is travelling above the region RE.

It should be noticed that the retransmitting satellite 2 according to the present method, system and device does not correspond to a mere relay satellite with two optical assemblies. Indeed, a mere relay satellite (that only resends the received light as such) would require optical assemblies of a same size, whereas, by means of the present method, system and device, the collected sunlight is concentrated before being retransmitted, allowing to provide the above mentioned advantageous characteristics.

Furthermore, in a particular embodiment, the retransmitting satellite 2 comprises a plurality of optical assemblies 3 and/or a plurality of optical assemblies 6.

Said controlling means 12 of the control center 11 comprise:
- a calculation unit 15 for determining control orders intended for said means 8 for adjusting the orientation of said optical assembly 6 of the retransmitting satellite 2; and
- data emitting means 13 being formed so as to transmit such control orders to cooperating data receiving means 14 (being mounted on the retransmitting satellite 2) via an electromagnetic wave link L, for example of the telemetry and telecommand (TM-TC) type. The means 14 then transmit such control orders to said adjusting means 8.

Said control center 11 further comprises usual satellite controlling means 16 cooperating more specifically with means 17 of the satellite 2. Such means 17 could comprise in particular a set of usual elements and functionalities of any satellite, being more specifically intended for:
- piloting the altitude and correcting the orbit OR of the satellite 2;
- supplying the necessary electric power; and
- ensuring a reasonable thermal environment to the on-board equipment.

In a preferred embodiment:
- said optical assembly 3 comprises a first very large surface mirror 19, being oriented to the sun S according to the axis 4 and focusing (that is, making converge) the collected light on a second mirror 20 being associated with said light transmitting means 10; and
- said optical assembly 6 comprises at least one similar set of means 21 and 22 for retransmitting the collected light, i.e. a first mirror 21 (with a smaller surface than the mirror 19) being oriented to the celestial body T according to the axis 7 and receiving the light from a second mirror 22 being associated with said light transmitting means 10 and making it diverge.

As the divergence implemented by the assembly 6 is less significant that the convergence implemented by the assembly 3, the sunlight is much concentrated in the retransmitted radiation R2 than in the collected radiation R1, that is, has a much higher flux density.

The transmission of the light from the optical assembly 3 occurs by means of usual elements being part of said means 10. Such means 10 preferably comprise one of the following means:
- a periscope;
- a set of optical guides; and
- at least one optical fibre.

Said mirrors 21 and 22 could be made in several parts in a material such as silicon carbide, withstanding the high temperatures resulting from the expected high flux density.

In a particular embodiment, said retransmitting satellite 2 comprises filtering means 30 for filtering the collected light so that the optical assembly 6 retransmits the light only in at least one predetermined frequency band. Preferably, said filtering means are obtained from surface treatments made on mirrors being used, more specifically of the optical assembly 6, and from using appropriate materials for the light transmitting means 10.

The system 1 according to the present method, system and device is thus particularly well appropriate for lighting up a particular area Z of any celestial body T, in particular of the Earth, but also of the Moon for example. In a particular embodiment, said system 1 comprises a plurality of retransmitting satellites 2 such as the above described one, rotating around the celestial body T, either on a same orbit OR or on different orbits.

In a preferred, but not exclusive, embodiment, said system 1 is intended for illuminating an area Z of the Earth T so as to reinforce photosynthesis therein.

In such a preferred embodiment, the control means 12 are intended for adjusting remotely the orientation of said optical assembly 6 for the retransmitting satellite 2 so that said retransmitting satellite 2 retransmits the collected sunlight on a given area Z of the Earth T, when travelling above a particular region RE, with the aim at reinforcing photosynthesis on this area Z.

The system 1 according to this preferred embodiment is thus able to produce a complementary lighting up and thereby to reinforce photosynthesis on any area Z of the Earth T, using, for this purpose, a gratis and freely available energy, that is sun energy.

In such a preferred embodiment, said filtering means of the retransmitting satellite 2 are formed so as to retransmit light in defined frequency bands respectively around 450 nm and 660 nm, corresponding to the light frequencies used by photosynthesis. Thus, only that part of the sun spectrum useful for the photosynthesis of plants and/or seaweed is retransmitted to the Earth. This allows the growth of plants and/or seaweed to be improved without however proportionally increasing the doses of ultraviolet and infrared radiation received on the ground.

Furthermore, said system 1 also comprises a service center 32 transmitting to said control center 11 requests from customers relating to reinforcing photosynthesis on particular areas of the Earth T. Such customers could be, for example, farming companies or co-operatives planning to increase their crops, while reinforcing photosynthesis, (including by night), on their cultivated grounds. In this preferred embodiment, the system 1 thus allows to generate an additional development of farming or aquaculture activities.

Said service center determines the operation schedule of the satellite(s) 2 and ensures the follow-up of the service and the corresponding billing. Such a service center could be located at the control center 11.

The invention claimed is:

1. A method for reinforcing photosynthesis on the Earth comprising:
   placing a retransmitting satellite in orbit around the Earth, comprising at least one set of on-board elements;
   providing a first optical assembly to collect sunlight, the first optical assembly being fixed with respect to a structure of said retransmitting satellite;
   providing a second optical assembly on said retransmitting satellite, said second optical assembly being smaller in size and inertia than said first optical assembly, said second optical assembly being configured to retransmit the light collected by said first optical assembly with a higher density of retransmitted flux than an originally collected flux density, and an orientation of said second optical assembly is adjustable with respect to the structure of the retransmitting satellite;
   providing remotely controllable equipment programmed to adjust the orientation of said second optical assembly;
   providing a light transmitter to transmit light collected by said first optical assembly to said second optical assembly at whatever the orientation of the second optical assembly; and
   providing a filter for filtering the collected light so that the second optical assembly retransmits the light only in frequency bands of around 450 nm to 660 nm;
   orienting the retransmitting satellite so that said first optical assembly always remains directed to the Sun, at least when the retransmitting satellite is travelling above a given region of the Earth where the Sun is visible so as to be able to collect sunlight upon such a travel; and
   orienting said second optical assembly to directly retransmit the collected sunlight on a given area of the Earth, upon its travel above said given area; and
   reinforcing photosynthesis on the given area of the Earth with the collected sunlight in frequency bands of around 450 nm to 660 nm.

2. The system according to claim 1, further comprising a service center transmitting to a control center requests from customers, relating to reinforcing photosynthesis on at least one particular area of the Earth.

3. The system according to claim 1, wherein the first optical assembly comprises modular mirrors.

4. The system according to claim 3, wherein the modular mirrors are silicon carbide mirrors.

5. The system according to claim 1, wherein the first optical assembly comprises a first set of mirrors positioned to focus collected light on a second mirror in order to increase the flux density of the light.

6. The system according to claim 1, wherein the second optical assembly further comprises a periscope, a set of optical guides, and at least one optical fiber.

7. The method according to claim 1, further comprising providing a control center for said retransmitting satellite, said control center comprising control equipment configured for remotely adjusting the orientation of said second optical assembly of the retransmitting satellite to directly retransmit the collected sunlight on a given area of the Earth, upon its travel above such a region, with the aim at reinforcing photosynthesis on said area of the Earth.

8. The method according to claim 7, wherein the control equipment comprises an electromagnetic wave link for transmitting orders to control the first optical assembly.

9. The method according to claim 8, wherein the electromagnetic wave link is a telemetry-telecontrol electromagnetic wave link.

10. A system in space for reinforcing photosynthesis on the Earth, said system comprising:
    a retransmitting satellite comprising:
    a first optical assembly for collecting sunlight, said first optical assembly being fixed to a structure of said retransmitting satellite;
    a second optical assembly positioned on the retransmitting satellite, the second optical assembly being smaller in size and inertia than said first optical assembly, said second optical assembly being configured for retransmitting the light collected by said first optical assembly with a higher density of retransmitted flux than an originally collected flux density, and an orientation of said second optical assembly is adjustable with respect to a structure of the retransmitting satellite;
    a light transmitter to transmit light collected by said first optical assembly to said second optical assembly, whatever the orientation of the second optical assembly; and
    a filter for filtering the collected light so that the second optical assembly retransmits the light only in frequency bands of around 450 nm to 660 nm;
    said retransmitting satellite being placed in orbit around the Earth, and oriented with said first optical assembly directed to the sun, at least upon its travel above a given region of the Earth, so as to be able to collect sunlight upon the travel;
    remotely controllable equipment programmed to adjust the orientation of said second optical assembly; and
    a control center of said retransmitting satellite, said control center comprising control equipment configured for remotely adjusting the orientation of said second optical assembly of the retransmitting satellite to directly retransmit the collected sunlight in frequency bands of around 450 nm to 660 nm on a given area of the Earth, upon its travel above the given area, to reinforce photosynthesis on said area given of the Earth.

11. The system according to claim 10, wherein said filter of the retransmitting satellite are achieved from surface treatments and from using appropriate materials for at least one of the following elements: the second optical assembly and the light transmitter.

12. The system according to claim 10, wherein the light transmitter of the retransmitting satellite comprise:
   a periscope;
   a set of optical guides; and
   at least one optical fibre.

13. The system according to claim 10, wherein said control equipment of the control center comprises:
   a calculation unit for determining control orders to be transmitted to said control equipment for adjusting the orientation of said second optical assembly of the retransmitting satellite; and
   a data emitter configured to transmit said control orders to said control equipment, via a cooperating data receiver being mounted on the retransmitting satellite.

14. The system according to claim 10, further comprising a service center transmitting to said control center requests from customers, relating to reinforcing photosynthesis on at least one particular area of the Earth.

15. The system according to claim 10, wherein the first optical assembly comprises modular mirrors.

16. The system according to claim 15, wherein the modular mirrors are silicon carbide mirrors.

17. The system according to claim 10, wherein the first optical assembly comprises a first set of mirrors positioned to focus collected light on a second mirror in order to increase the flux density of the light.

18. The system according to claim 10, wherein the second optical assembly further comprises receiving equipment comprising a mirror for receiving light transmitted from the first optical assembly.

19. The system according to claim 10, wherein the control equipment comprises an electromagnetic wave link for transmitting orders to control the first optical assembly.

20. The system according to claim 19, wherein the electromagnetic wave link is a TM-TC electromagnetic wave link.

\* \* \* \* \*